(12) United States Patent
Thangaraj et al.

(10) Patent No.: US 6,660,413 B1
(45) Date of Patent: Dec. 9, 2003

(54) COMPONENT OF A MAGNETIC RECORDING MEDIUM WITH SEALING LAYER FOR CORROSION PROTECTION

(75) Inventors: Raj Thangaraj, Fremont, CA (US);
Kueir-Weei Chour, San Jose, CA (US);
Xiaoding Ma, Fremont, CA (US);
Huan Tang, Los Altos, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/964,492

(22) Filed: Sep. 28, 2001

Related U.S. Application Data
(60) Provisional application No. 60/283,602, filed on Apr. 12, 2001.

(51) Int. Cl.[7] .............................. G11B 5/66; G11B 5/70; B32B 15/00; H01J 1/00
(52) U.S. Cl. ..................... 428/694 TP; 428/694 TC; 428/611; 428/660; 428/661; 428/662; 428/663; 428/665; 428/900
(58) Field of Search ..................... 428/694 TP, 900, 428/694 TC, 611, 660, 661, 662, 663, 665

(56) References Cited

U.S. PATENT DOCUMENTS

| | | | |
|---|---|---|---|
| 4,840,843 A | 6/1989 | Sano et al. | 428/336 |
| 4,883,711 A | * 11/1989 | Shiroishi et al. | 428/336 |
| 5,344,706 A | * 9/1994 | Lambeth et al. | 428/336 |
| 5,389,398 A | 2/1995 | Suzuki et al. | 427/130 |
| 5,607,740 A | 3/1997 | Noda | 428/65.3 |
| 5,624,725 A | 4/1997 | Nelson et al. | 428/65.5 |
| 5,897,931 A | 4/1999 | Ahlert et al. | 428/65.5 |
| 6,146,737 A | 11/2000 | Malhotra et al. | 428/65.5 |
| 6,168,845 B1 | 1/2001 | Fontana, Jr. et al. | 428/65.5 |

FOREIGN PATENT DOCUMENTS
JP  64-62815  3/1989

\* cited by examiner

*Primary Examiner*—Holly Rickman
(74) *Attorney, Agent, or Firm*—Morrison & Foerster LLP (57) ABSTRACT

A component of a recording device comprising a magnetic layer, means for improving corrosion resistance of the magnetic layer and a carbon overcoat, and a method of making and using the same are disclosed. The means for improving corrosion resistance of the magnetic layer comprises a sealing layer comprising a refractory metal or a refractory metal-containing alloy.

15 Claims, 9 Drawing Sheets

← Lubricant 36

← Overcoat layer 35

← Refractory metal-containing sealing layer 34

← Magnetic Layer 32

← Substrate 30

Carbon overcoat
Cap or sealing layer
Magnetic layer

Figure 5b

Carbon overcoat
Cap or sealing layer of Example 1 with oxygen
Magnetic layer

Figure 5c

Carbon overcoat
Cap or sealing layer of Example 1 with oxygen
Cap or sealing layer of Example 1
Magnetic layer

Figure 5d

Carbon overcoat
Cap or sealing layer of Example 1 with nitrogen
Magnetic layer

Figure 5e

Carbon overcoat
Cap or sealing layer of Example 1 with nitrogen
Cap or sealing layer of Example 1
Magnetic layer

COMPONENT OF A MAGNETIC RECORDING MEDIUM WITH SEALING LAYER FOR CORROSION PROTECTION

RELATED APPLICATIONS

This application claims priority from Provisional Application Serial No. 60/283,602 filed Apr. 12, 2001, entitled "Magnetic Recording Media With Sealing Layer For Corrosion Protection," the entire disclosure of which is hereby incorporated herein by reference.

FIELD OF THE INVENTION

The present invention relates to a component of a recording device, such as a recording medium and slider, with a refractory metal or a refractory metal-containing alloy coating to protect the component from corrosion.

BACKGROUND

Most modern information storage systems depend on magnetic recording due to its reliability, low cost, and high storage capacity. The primary elements of a magnetic recording system are the recording medium, and the read/write head. Magnetic discs with magnetizable media are used for data storage in almost all computer systems.

Figure 8:
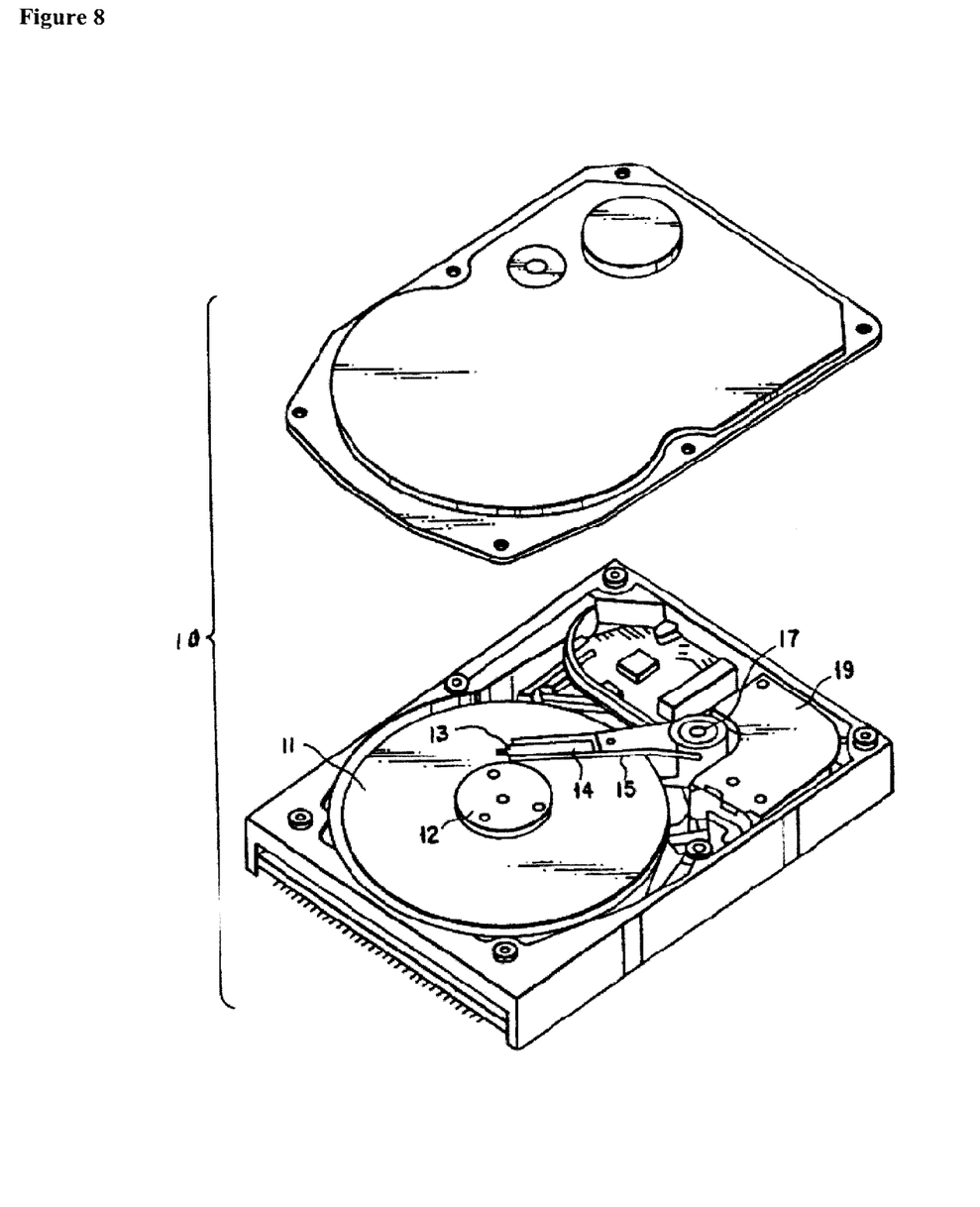
FIG. 8 is a view of a magnetic disk drive.
Figure 9:
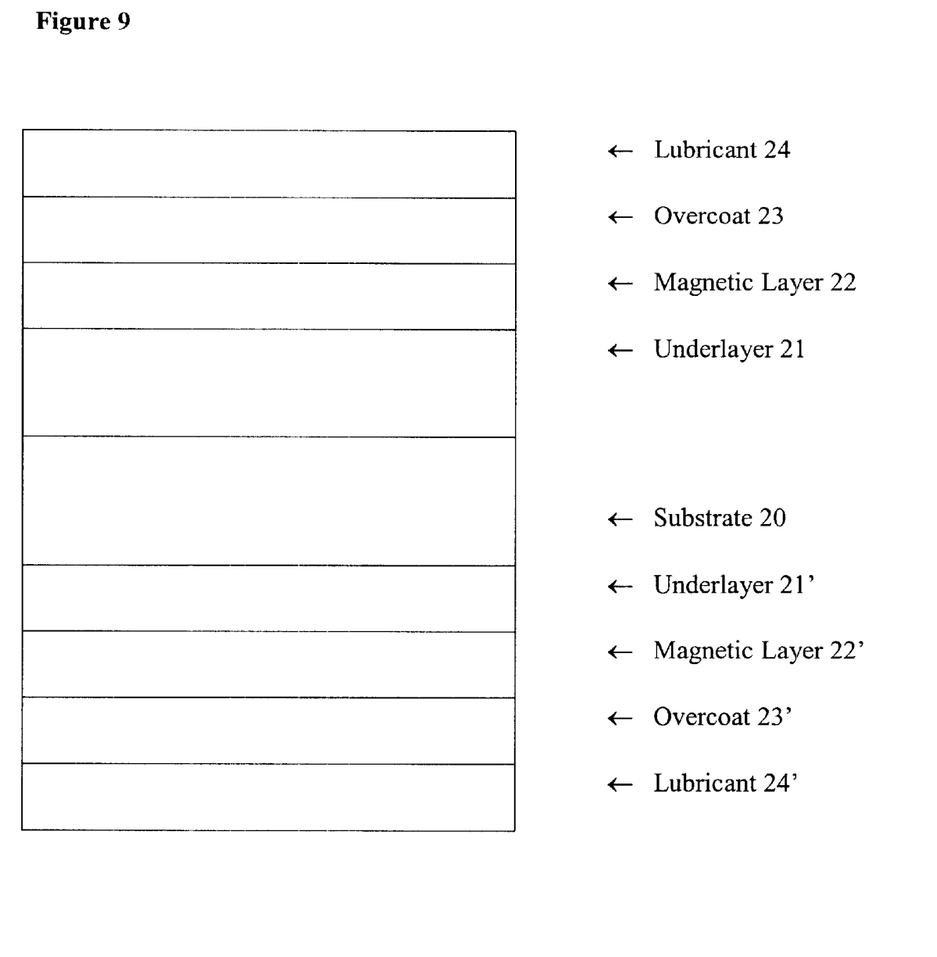
FIG. 9 schematically shows a conventional magnetic recording medium (Prior Art).

FIG. 8 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. The rotary actuator could have several suspensions and multiple magnetic heads to allow for simultaneous recording and reproduction on and from both surfaces of each medium. A voice coil motor 19 as a kind of linear motor is provided to the other end of the arm 15. The arm 15 is swingably supported by ball bearings (not shown) provided at the upper and lower portions of a pivot portion 17.

A conventional longitudinal recording disk medium is depicted in FIG. 8 and typically comprises a non-magnetic substrate 20 having sequentially deposited on each side thereof an underlayer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat 24, 24' to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy underlayer.

A conventional longitudinal recording disk medium is prepared by depositing multiple layers of metal films to make a composite film. In sequential order, the multiple layers typically comprise a non-magnetic substrate, a seedlayer, one or more underlayers, a magnetic layer, and a protective carbon layer. Generally, a polycrystalline epitaxially grown cobalt-chromium (CoCr) magnetic layer is deposited on a chromium or chromium-alloy underlayer.

The seed layer, underlayer, and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20Å thick.

Lubricants conventionally employed in manufacturing magnetic recording media typically comprise mixtures of long chain polymers characterized by a wide distribution of molecular weights and include perfluoropolyethers, functionalized perfluoropolyethers, perfluoropolyalkylethers (PFPE), and functionalized PFPE. PFPE do not have a flashpoint and they can be vaporized and condensed without excessive thermal degradation and without forming solid breakdown products. The most widely used class of lubricants includes perfluoropolyethers such as AM 2001®, Z-DOL®, Ausimont's Zdol or Krytox lubricants from DuPont.

There is a demand in computer hard drive industry to develop an areal storage density of 100 Gbits/inch$^2$ and higher in the future. With this high areal density, the flying height between the read-write head and the media has to be minimized. Current magnetic hard disc drives operate with the read-write heads only a few nanometers above the disc surface and at rather high speeds, typically a few meters per second. Because the read-write heads can contact the disc surface during operation, a thin layer of lubricant overcoat is coated on the disc surface to reduce wear and friction. The overcoat thickness of the rigid disk on these future disk drives is estimated to be less than 3 nm.

In order for a disk drive to perform reliably in service, all the components in the drive need to perform reliably under severe mechanical and environmental conditions. Recording media is one of the components, which is subjected to cyclical head medium contact and, at times, exposed to severe environmental conditions. Wear and friction have been recognized as potential problems in a recording medium.

To protect the recording media from wear and friction, protective layers of carbon overcoat and liquid lubricant film are coated on the magnetic media. Diamond-like carbon (DLC) has been used as one of the protective layers for magnetic recording media. DLC films have primarily been deposited on to the magnetic media by DC or RF magnetron sputtering.

One solution for improving the wear resistance is proposed in U.S. Pat. No. 5,674,638 (Grill). Grill suggests using a thick fluorinated diamond-like carbon layer of thickness in the range between 3 nm and 30 nm. Column 3, lines 59–63 of Grill. Grill requires the use of a thick fluorinated carbon overcoat layer because the objective of Grill was to improve wear resistance, which generally increases with increased thickness.

The solution adopted to overcome wear and friction in the newer generation of recording media is to use new air bearing design that minimize wear due to the contact of the disk and the slider. By using the advanced air bearing designs, it would be possible to reduce the overcoat layer thickness to less than 3 nm to decrease the gap between the head and the recording medium and, thereby, increase the areal density of the recording medium.

However, when the thickness of the overcoat is reduced to less than 5 nm, applicants recognized that the magnetic layer is more prone to corrosion. The problems associated with the poor corrosion resistance of a thin overcoat layer having a thickness of less than 3 nm was not recognized and solved prior to this invention and the invention of co-pending application Ser. No. 09/870,685, entitled, "Corrosion Resistant Overcoat For A Component Of A Recording Device," filed Jun. 1, 2001, which includes inventors from those listed on this application. Applicants of Ser. No. 09/870,658 found that amorphous fluorinated carbon (a-C:F,H) has a great potential to replace the conventional overcoat materials for hard disk and sliders because it shows significant superiority in corrosion resistance over the traditional hydrogenated carbon produced by sputtering and ion beam deposition.

Figure 1:
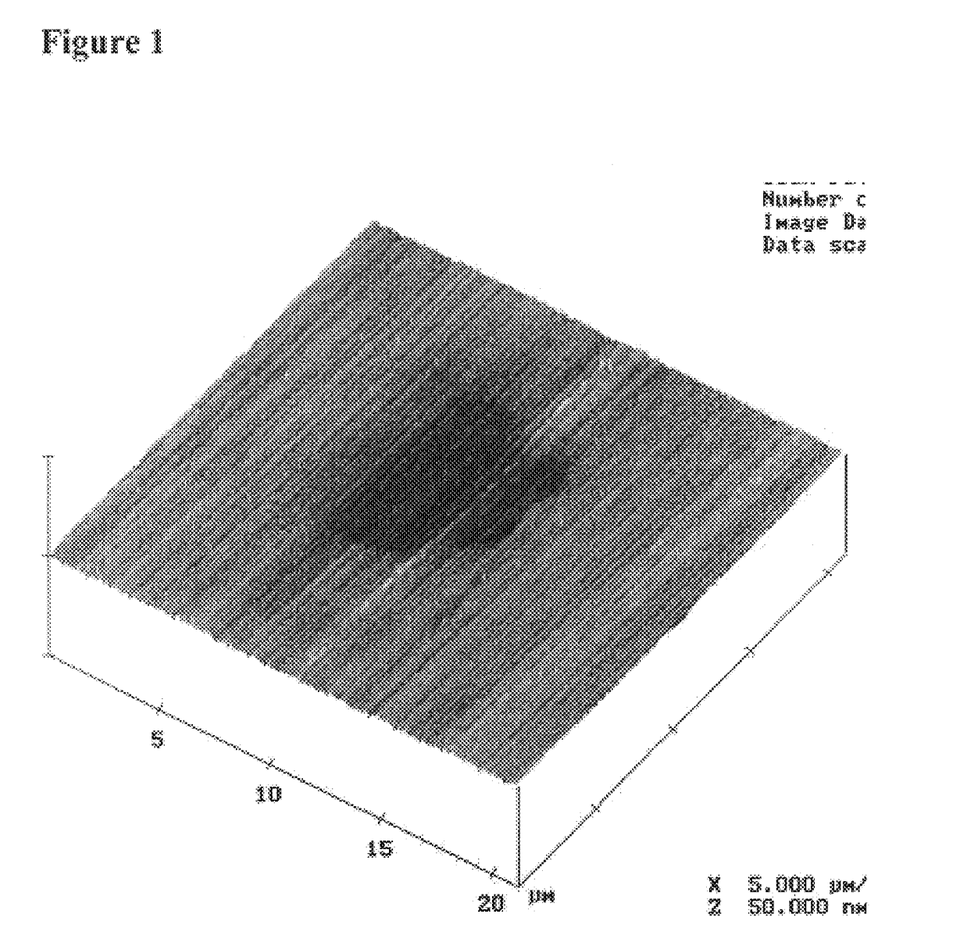
FIG. 1 shows a typical 45 Å deep carbon void in an 60 Å carbon overcoat media.
Figure 2:
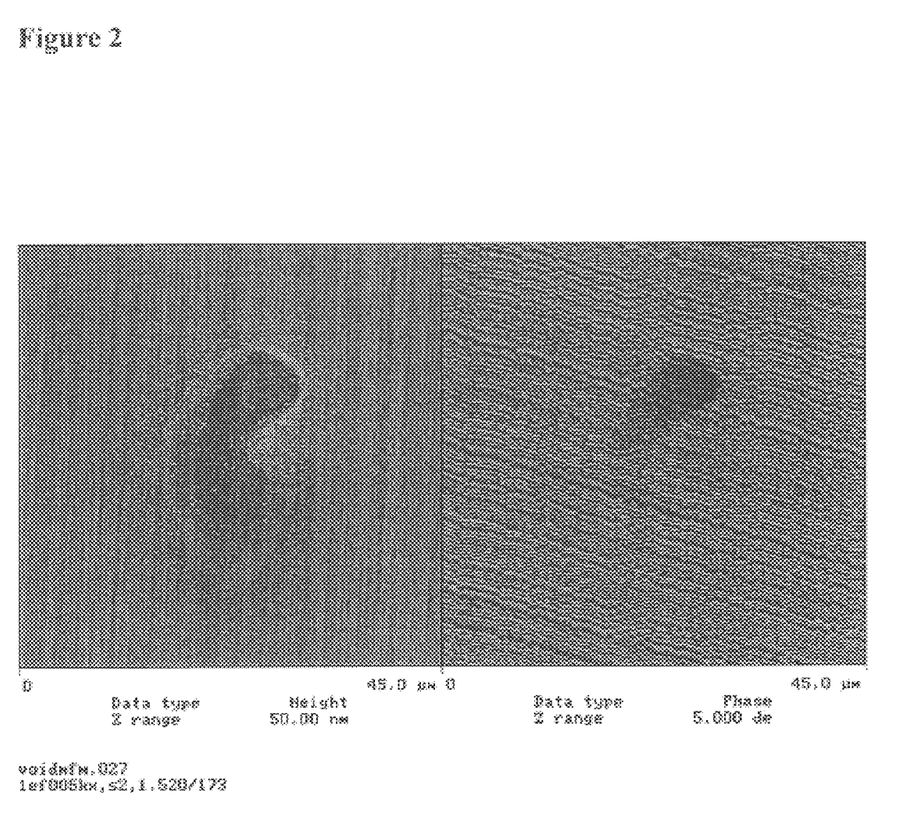
FIG. 2 shows a typical carbon void with depth same as carbon thickness causes magnetic defect.

More recently a variety of techniques such as plasma enhanced chemical vapor deposition (PECVD), ion beam deposition (IBD), and filtered cathodic arc deposition (FCA) are being evaluated for making durable corrosion resistant overcoat films. In a typical manufacturing method using DC or RF magnetron sputtering or any coating technique which uses plasma process, microconatmination of the magnetic surface may occur as a result of flakes or debris sticking to virgin magnetic surface prior to carbon deposition. The amount of contamination will depend upon the chamber cleanliness and target conditions. After carbon overcoat deposition, the disks undergo post process steps, which includes a buffing process to remove asperities, for flying a read/write head at close proximity to the disk surface. In the process of removing asperities, flakes or debris introduced during the carbon overcoat process may be removed, which leaves behind voids. The size of the voids depends upon the flake/debris size. If the size of the voids equals the thickness of the overcoat, then it leaves open metal sites, which are prone to corrosion. A typical void in a 60 Å A overcoat media produced by the post-sputter process is shown in FIG. 1. The typical size as measured by AFM of these voids in a batch of disks range from 3–15$\mu$m, and the depth varies from 20–50 Å. As can be seen, these voids may not create any corrosion issues in a 60 Å thick overcoat media. However, when the size of the voids equals or exceeds the thickness of the overcoat, these voids promote corrosion of the magnetic layer, which in turn generates magnetic defects as shown in FIG. 2. The AFM phase image on the right-hand side shows the magnetic defect at the location of the carbon void shown on the left-hand side image. Unless an extremely clean environment free of nanometer-sized or larger debris can be maintained inside the deposition chamber the issue of carbon voids and subsequent corrosion causing magnetic defects becomes a serious problem for media with decreasing overcoat thickness. Hence a media design, which includes methods to eliminate flakes/debris or to protect the magnetic layer with an intermediate protective coating, should be beneficial for the corrosion protection.

Also, most disk drives produced currently operate in the Contact Start/Stop (CSS) mode. Since the recording head contacts with recording media during takeoff and landing, corrosion of the magnetic layer due to a large number of CSS cycles could be a major cause of drive failure. To ensure good corrosion resistance, applicants have found that a sealing layer having the ability to prevent corrosion of the magnetic layer is required and a layer of a traditional overcoat material, such as hydrogenated (a-C:H), nitrogenated (a-C:N) carbon, hybrid (a-CHN), dual layer (a-CH/a-CHN) or graded (a-CH/a-CHN), having a thickness of 50 Å or less, could be insufficient in protecting the hard disk media from corrosion, and at the thickness level of less than 3 nm, corrosion will be a serious problem.

Therefore, there exists a need for a system that provides a good corrosion resistance of the magnetic layer.

SUMMARY OF THE INVENTION

A refractory metal or a refractory metal-containing alloy material has a great potential for corrosion prevention of a magnetic material when the refractory metal-containing material is used as a sealing layer material for a component of a recording medium. A component of a magnetic recording medium of this invention includes a recording disk medium, a recording tape medium or a recording head.

An embodiment of this invention is a component of a magnetic recording medium, comprising a magnetic layer and a sealing layer on the magnetic layer, wherein the sealing layer comprises a refractory metal or a refractory metal-containing alloy and has a thickness of less than 10 Å. The refractory metal is selected from the group consisting of Ti, Zr, Nb, Mo, Ta, and W. The sealing layer could further comprise oxygen and/or nitrogen. The sealing layer is selected from the group consisting of Ti, Zr, Nb, Mo, Ta, W, CrTi, CrZr, CrNb, CrMo, CrTa, CrW, TiW, ZrW, NbW, TaW, an oxide of Ti, an oxide of Zr, an oxide of Nb, an oxide of Mo, an oxide of Ta, an oxide of W, an oxide of CrTi, an oxide of CrZr, an oxide of CrNb, an oxide of CrMo, an oxide of CrTa, an oxide of CrW, an oxide of TiW, and oxide of ZrW, an oxide of NbW, an oxide of TaW, a nitride of Ti, a nitride of Zr, a nitride of Nb, a nitride of Mo, a nitride of Ta, a nitride of W, a nitride of CrTi, a nitride of CrZr, a nitride of CrNb, a nitride of CrMo, a nitride of CrTa, a nitride of CrW, a nitride of TiW, and oxide of ZrW, a nitride of NbW, and a nitride of TaW. The component could further comprise a carbon overcoat on the sealing layer. The carbon overcoat could have a thickness in a range from about 10 to 50 Å. The component could further comprise another sealing layer. The another sealing layer could comprise a material selected from the group consisting of a refractory metal, a refractory metal-containing alloy, an oxide of a refractory metal, an oxide of a refractory metal-containing alloy, a nitride of a refractory metal, a nitride of a refractory metal-containing alloy, and combinations thereof. The component could further comprise a carbon overcoat on the another sealing layer, the carbon overcoat having a thickness in a range from about 10 to 50 Å.

Another embodiment of this invention is a method for preventing corrosion of a magnetic layer due to contact start-stop of a recording medium, comprising exposing the magnetic layer to a refractory metal or a refractory metal-containing alloy and depositing a sealing layer comprising the refractory metal or the refractory metal-containing alloy on the magnetic layer, wherein the sealing layer prevents corrosion of the magnetic layer due to contact start-stop of the recording medium. The method could further comprise depositing a carbon overcoat of a thickness in a range from about 10 to 50 Å on the refractory metal-containing sealing layer.

Another embodiment of this invention is a method of manufacturing a component of a recording medium comprising depositing a first sealing layer on a magnetic layer and depositing a second sealing layer on the first sealing layer, wherein the first sealing layer comprises a refractory metal or a refractory metal-containing alloy. The first sealing layer and/or the second sealing layer could further comprise oxygen and/or nitrogen. In a method of this invention, the carbon overcoat could be deposited by a technique selected from the group consisting of plasma enhanced chemical vapor deposition, ion beam deposition and filtered cathodic arc deposition.

Another embodiment of this invention is a component of a recording medium, comprising a first sealing layer on a magnetic layer and a second sealing layer on the first sealing layer, wherein the first sealing layer comprises a refractory metal or a refractory metal-containing alloy.

Yet another embodiment of this invention is a component of a magnetic recording medium comprising a magnetic material and means for preventing corrosion of the magnetic material due to contact start-stop of the recording medium.

The phrase "means for preventing corrosion of the magnetic material due to contact start-stop of the recording medium" refers to a refractory metal or a refractory metal-containing alloy layer of thickness less than 10 Å.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings.

FIGS. 5 (a) to (e) shows some embodiments of the invention.

DETAILED DESCRIPTION OF THE INVENTION

The invention is directed to a method to prevent corrosion of the media due to voids and other defects present in thin carbon overcoats by the addition of an intermediate sealing layer between the magnetic layer and carbon overcoat.

As the overcoat thickness on magnetic thin film media continues to decrease to near atomic levels, the corrosion protection of the underlying magnetic media becomes paramount. To prevent electrical signal degradation and possible loss of head flying characteristics, the overcoat, even at these near-atomic levels, must prevent diffusion of species through its thickness or defects present in the film. Depending upon the corrosion mechanism, metallic cations, most notably cobalt, from the magnetic layer may diffuse to the surface of the carbon overcoat and react with adsorbed species to form corrosion products. Alternatively, adsorbed species may diffuse through the overcoat layer or defects in the layer and react with cobalt located on the top surface of the magnetic layer.

To prevent this diffusion, one could deposit layers that are amorphous in nature to prevent diffusion of species through crystallographic planes and pathways. Amorphous films also eliminate the grain-boundary diffusion problem found in polycrystalline overcoat films. The overcoat of choice is DC-magnetron sputtered amorphous carbon that may or may not contain various doping elements such as H or N. The intermediate cap layer design consists of an material containing refractory metals and alloys alone, or with oxygen, or with nitrogen. The metal layer is selected based on its corrosion-resistant properties.

Thin layers of metal oxides are amorphous in nature and can be classified into three different types: network-forming, intermediate, and network-modifying. The relative dividing line between them can be determined by the strength of the single oxide bond strength.

Network-forming oxides have covalent bonds between the atoms in a three dimensional structure with short-range order on the atomic scale but no long-range order. No crystallinity is seen in these type of oxides. This is due to the directional nature of the covalent bonds.

Network-modifying oxides have non-directional ionic bonds that enable easier alignment into crystalline planes. Most of these oxides are crystalline or micro-crystalline in nature. The addition of a network-modifying oxide into a network-forming oxide results in breakage of some of the covalent bonds and alters the properties of the resulting oxide.

A convenient metric to determine if an oxide will be network-forming or network-modifying is to examine the single oxide bond strength. Single oxide bond strengths of greater than 75 kcal/mole lead to network formers and strengths less than 50 kcal/mole lead to network modifiers. Between 50 and 75 kcal/mole are oxides termed intermediates that form micro-crystalline layers at low temperatures. Table 1 lists single bond energies for various oxides.

TABLE 1

| Values of Single Oxide Bond Strengths | | |
|---|---|---|
| M in Mox | Valence | Bond Strength (kcal/mole) |
| B | 3 | 119 |
| Si | 4 | 106 |
| Ta | 5 | 104 |
| W | 6 | 104 |
| Al | 3 | 101–79 |
| P | 5 | 111–88 |
| Zr | 4 | 81 |
| Ti | 4 | 73 |
| Zn | 2 | 72 |
| Pb | 2 | 73 |
| Al | 3 | 67–53 |
| Zr | 4 | 61 |
| Cr | 3 | 47 |
| Sn | 4 | 46 |
| Cu | 2 | 44 |
| In | 3 | 43 |
| Mg | 2 | 37 |
| Li | 1 | 36 |
| Zn | 2 | 36 |
| Ba | 2 | 33 |
| Ca | 2 | 32 |
| Fe | 2 | 32 |
| Ni | 2 | 28 |
| Na | 1 | 20 |

The amorphous nature of the metal oxide layers make them particularly suitable for corrosion barriers on magnetic media. With a suitable adjustment of the deposition parameters, a variety of oxide stoichiometries to meet the particular corrosion problem of interest as well as a variety of microstructures ranging from amorphous to micro-crystalline to crystallline are created.

The cap or sealing layer of this invention comprises a refractory metal or a refractory metal-containing alloy with or without oxygen or nitrogen. Such a sealing layer is able to minimize the diffusion of anions to the magnetic layer interface from the environment or the amount of cations from escaping the magnetic layer interface because the refractory alloy forms a very strong corrosion resistant passive film having an amorphous structure.

Figure 3:
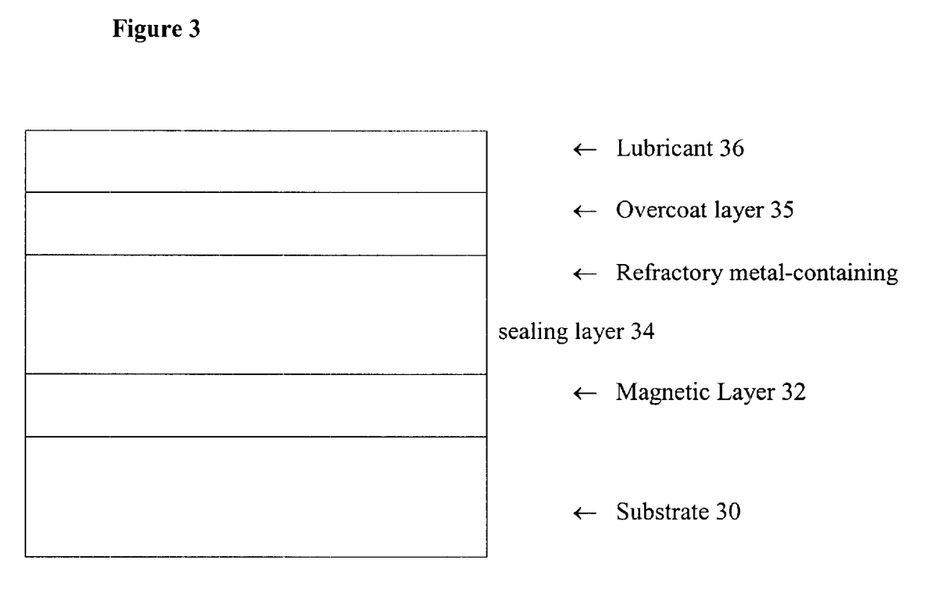
FIG. 3 schematically shows a magnetic recording medium according to and embodiment of the invention.

An embodiment of a recording disk medium of this invention is depicted in FIG. 3, which comprises a non-magnetic substrate 30 having sequentially deposited on one side thereof a magnetic layer 32, typically comprising a cobalt (Co) -base alloy, a sealing layer 34 comprising a refractory metal or a refractory metal-containing alloy and a carbon overcoat layer 35. In addition, the disk medium of this invention could comprise bonding a lubricant topcoat 36 to the thin carbon overcoat 35 and depositing an underlayer and/or seedlayer below the magnetic layer 32.

The sealing layer could further contain a boron nitride, boron carbide, silicon carbide, silicon nitride, transition metal carbides and nitrides (such as titanium nitride and carbide, zirconium nitride and carbide, etc.), hard network-forming ionic oxides (such as aluminum or tungsten or tantalum oxides).

The thickness of the sealing layer could be less than 10 Å, preferably less than 7 Å, and most preferably less than 5 Å.

The carbon overcoat 35 could be amorphous hydrogenated or nitrogenated or fluorinated carbon or hybrids of these individual layers or dual layers or graded overcoat layers.

Embodiments of the substrate include any substrate made of a glass or glass-ceramic, NiP/Al, metal alloys, plastic/polymer material, ceramic, glass-polymer, composite materials or other non-magnetic materials.

The seed layer and/or the underlayer could comprise Cr and/or C-containing material, e.g., chromium vanadium (CrV) or an alloy of Co, Cr, platinum and tantalum (CoCrPtTa). The seed layer could have a thickness of about 20 to 800 Å, preferably about 25 to 200 Å. The underlayer could have a thickness of about 10 to 500 Å, preferably about 15 to 200 Å.

Embodiments of the present invention also comprise forming an intermediate layer, such as Cr or Cr-containing alloy, between the underlayer layer and magnetic layer. Suitable intermediate layer includes CrW, CoCr or Cr alloy at a thickness of 10 to 500 Å, preferably about 50 to 200 Å. Suitable magnetic layer includes a Co-containing layer, such as a CoCrPtTa alloy at a thickness of about 25 to 500 Å, preferably about 50 to 250 Å.

EXAMPLES

The invention will be better understood with reference to the following examples, which are intended to illustrate specific embodiments within the overall scope of the invention as claimed.

Advantageously, the present invention could be conducted by sequentially sputter depositing layers on a substrate in an in-line pass-by apparatus comprising a plurality of sequentially spaced sputtering chambers. The deposited layers comprise optionally an underlayer, a magnetic layer, optionally a hard layer, and a thin carbon overcoat layer.

Refractory metal-containing sealing layer can be deposited in a sputtering chamber of pass-by in-line apparatus or stand-alone system, in which the targets are made up of refractory metals or refractory metal containing alloys with or without oxygen or nitrogen. Alternatively, reactive sputtering could be used to deposit oxides or nitrides of refractory metals or refractory metal containing alloys.

Carbon overcoat layers can be directly deposited on to the magnetic layers from a carbon target, or partially from gas-phase plasma chemical vapor deposition (CVD) and partially sputtered from a carbon target, or fully by CVD, or using energetic carbon ions, or by filtered cathodic arc (FCA) deposition.

Figure 4:
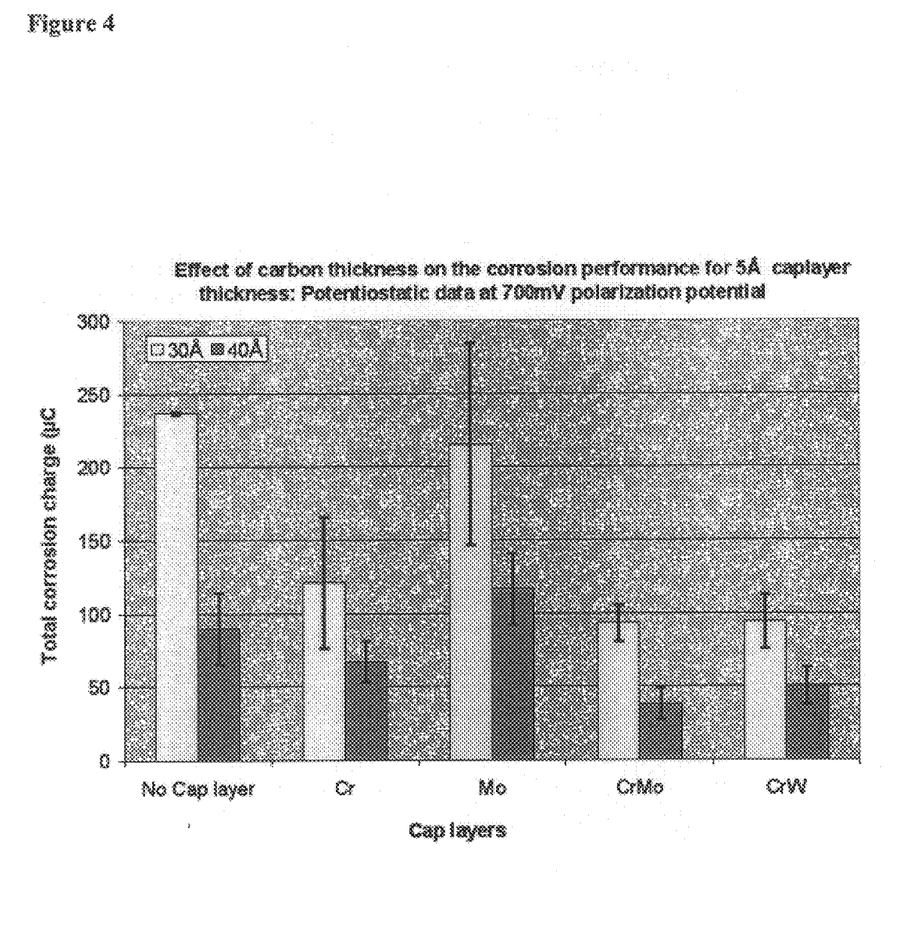
FIG. 4 shows potentiostatic corrosion data showing better corrosion performance for 5 Å CrMo and CrW sealing layer with 30 and 40 Å carbon overcoat.

As shown in FIG. 4, the potentiostatic corrosion data for media designs of this invention, disclosed below in the Examples, incorporating CrMo and CrW sealing layer in between magnetic and carbon overcoat shows improvement in the corrosion performance. FIG. 4 shows that the total corrosion charge of disk recording medium with no cap layer, i.e., sealing layer, with carbon layer thickness of 30 Å is about 250 $\mu$C. On the other hand, with the inclusion of a 5 Å thick layer of CrMo or CrW, the total corrosion charge decreases to about 10 $\mu$C, which is about 40% the total corrosion charge without the 5 Å thick refractory metal-containing layer of CrMo and CrW. FIG. 4, therefore, shows the dramatic improvement in corrosion resistance of the disk recording medium by the inclusion of a thin refractory metal-containing layer of about 5 Å thickness between the magnetic layer and carbon overcoat.

Example 1

Figure 5A:
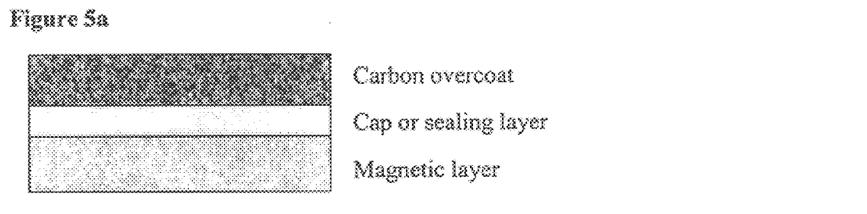

As illustrated in FIG. 5a, the media of Example 1 comprises a CoCr based magnetic layer, on which a thin (3–9 Å) metal alloy formed with Ti, V, Cr, Nb, Mo, Ta, and W elements, e.g., CrMo, CrW, is deposited by DC or RF magnetron sputtering or plasma enhanced chemical vapor deposition (PECVD). Then carbon overcoat with thickness ranging from 10 to 50 Å is deposited either by DC or RF magnetron sputtering or by one of the following high-energy carbon deposition techniques: a) plasma enhanced chemical vapor deposition (PECVD), b) ion beam deposition (IBD), and c) filtered cathodic arc deposition (FCA).

Example 2

Figure 5B:
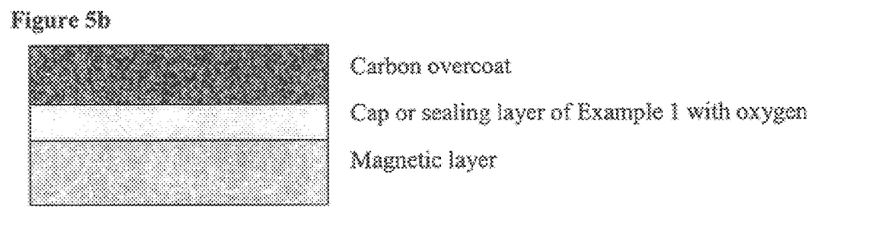
Figure 5C:
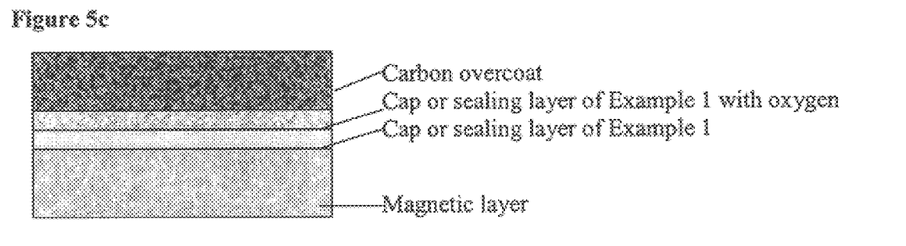

As illustrated in FIG. 5b, the media design of Example 2 comprises a CoCr based magnetic layer, on which a thin (3–9 Å) oxide layer formed with Ti, V, Cr, Nb, Mo, Ta, and W elements and oxygen, e.g., $(CrMo)_{1-x}O_x$, $(CrW)_{1-x}$, is deposited by DC or RF magnetron sputtering or plasma enhanced chemical vapor deposition (PECVD). Further incorporating the sealing layer of Example 1 as shown in FIG. 5c is another embodiment of the design. Then carbon overcoat with thickness ranging from 10 to 50 Å is deposited either by DC or RF magnetron sputtering or by one of the following high-energy carbon deposition techniques: a) plasma enhanced chemical vapor deposition (PECVD), b) ion beam deposition (IBD), and c) filtered cathodic arc deposition (FCA).

Example 3

Figure 5D:
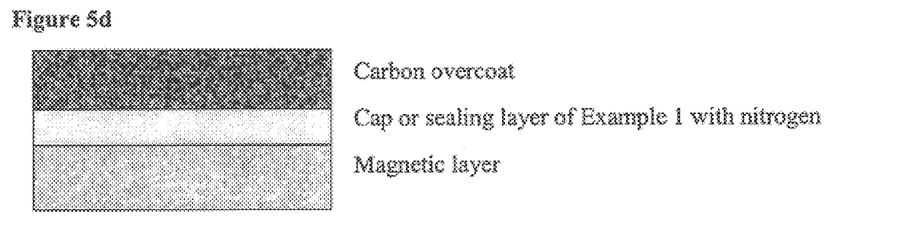
Figure 5E:
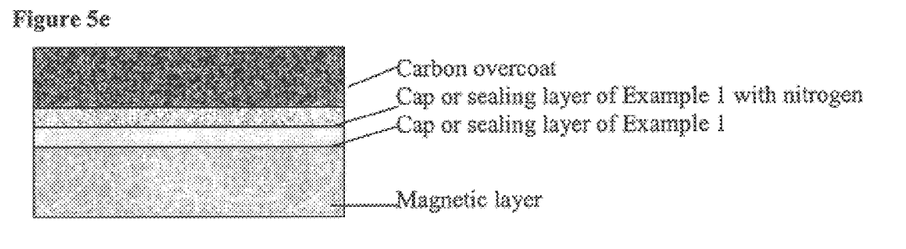

As illustrated in FIG. 5d, the media design of Example 3 comprises a CoCr based magnetic layer, on which a thin (3–9 Å) oxide layer formed with Ti, V, Cr, Nb, Mo, Ta, and W elements and oxygen, e.g., $(CrMo)_{1-x}N_x$, $(CrW)_{1-x}N_x$, is deposited by DC or RF magnetron sputtering or plasma enhanced chemical vapor deposition (PECVD). Further incorporating the sealing layer of Example 1 as shown in FIG. 5e is another embodiment of the design. This design will be utilized when nitrogen poisoning of the magnetic layer occurs. To prevent this problem, the media design of Example 3 could have a graded interface. Here a "graded interface" refers to interface that are not sharp i.e. no distinction between the first and the second layer or diffuse interface, as compared to an "interface," which refers to sharp interface between two layers.

Then carbon overcoat with thickness ranging from 10 to 50 Å is deposited either by DC or RF magnetron sputtering or by one of the following high-energy carbon deposition techniques: a) plasma enhanced chemical vapor deposition (PECVD), b) ion beam deposition (IBD), and c) filtered cathodic arc deposition (FCA).

Example 4

Media Performance

Figure 6:
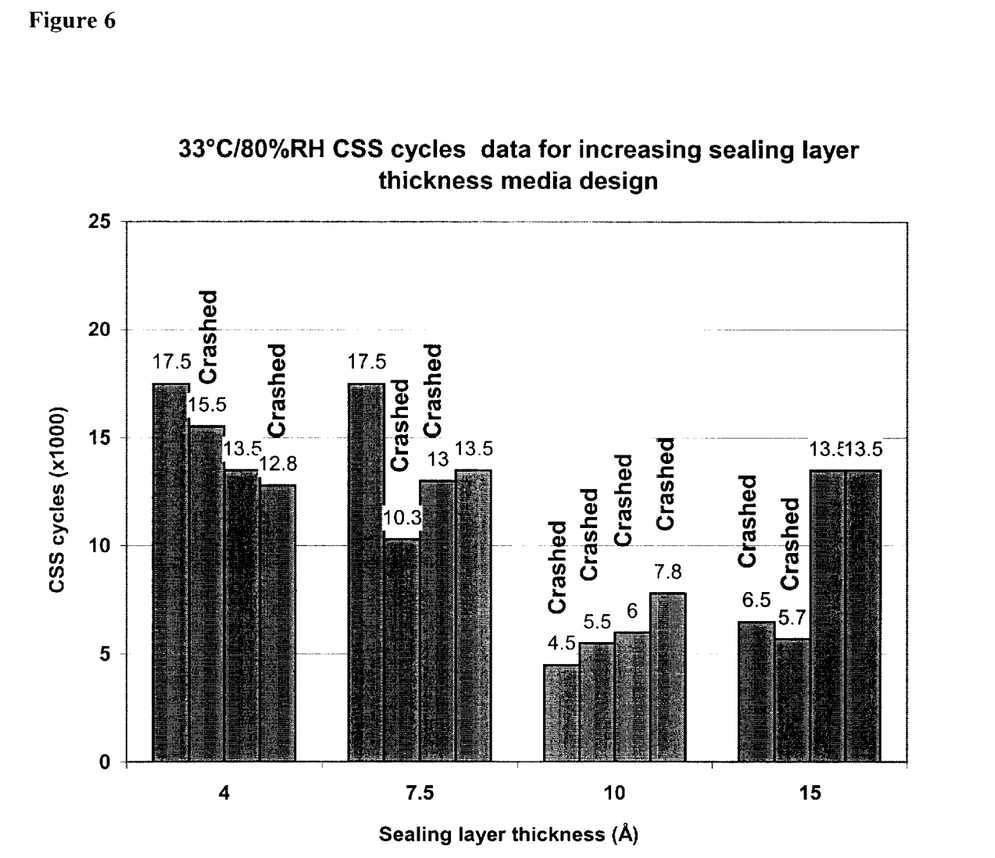
FIG. 6 shows the contact-start-stop (CSS) performance of disks with increasing sealing layer thickness.

As illustrated in FIG. 6, the contact-start-stop (CSS) performance of a media design incorporating a sealing layer is poor when the sealing layer thickness is increased. As can be seen in FIG. 6, out of the 4 disc surfaces tested, a higher number of crashes occurred with increasing sealing layer thickness, for example, 4 out of 4 failed for a 10 Å sealing layer thickness. FIG. 6 also shows that crash occurred at much lower cycles for a media design having a thicker sealing layer.

Figure 7:
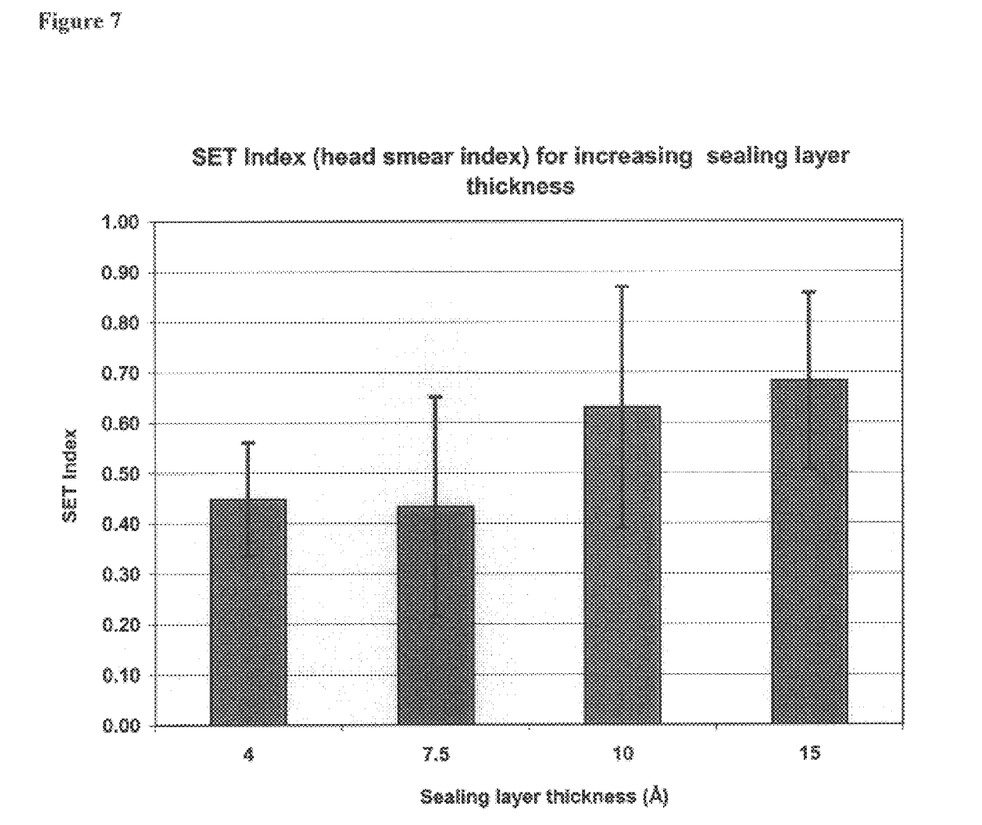
FIG. 7 is a stress environmental test (SET) index showing the severity of head smear with increasing sealing layer thickness.

FIG. 7 shows the SET index, which is a head smear index for a magnetic recording medium exposed to 80° C./80%RH for 4 days and swept with a product head at 33° C./80%RH for 24 hours, for different sealing layer thickness. The SET index defines the amount of debris picked up by the sweeping head. The higher the SET index, a greater amount of the debris is picked-up by the sweeping head. FIG. 7 shows that the SET index increases with increasing sealing layer thickness. It illustrates the detrimental effect of increasing the sealing layer thickness, in particular, above 10 Å.

Applicants believe that they are the first to recognize that the CSS performance and SET index are variables that achieve a specific result as a function of the sealing layer thickness. The prior art did not recognize that the CSS performance and SET index are a function of the sealing layer thickness. In addition, applicants have unexpectedly found that it is important to limit the sealing layer thickness below 10 Å for improved CSS performance for media design incorporating sealing layers when the carbon overcoat thickness is <50 Å. For the reasons stated above, applicants have found that it is desirable to limit the sealing layer thickness to below 10 Å for improved media performance.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A component of a magnetic recording medium, comprising a magnetic layer, a sealing layer on the magnetic layer, another sealing layer directly on the sealing layer, and a carbon overcoat on the another sealing layer, wherein the sealing layer comprises a refractory metal or a refractory metal-containing alloy and has a thickness of less than 10 Å and the another sealing layer comprises a refractory metal or a refractory metal-containing alloy.

2. The component of claim 1, wherein the refractory metal is selected from the group consisting of Ti, Zr, Nb, Mo, Ta, and W.

3. The component of claim 1, wherein the sealing layer further comprises oxygen and/or nitrogen.

4. The component of claim 1, wherein the sealing layer is selected from the group consisting of Ti, Zr, Nb, Mo, Ta, W, CrTi, CrZr, CrNb, CrMo, CrTa, CrW, TiW, ZrW, NbW, TaW, an oxide of Ti, an oxide of Zr, an oxide of Nb, an oxide of Mo, an oxide of Ta, an oxide of W, an oxide of CrTi, an oxide of CrZr, an oxide of CrNb, an oxide of CrMo, an oxide of CrTa, an oxide of CrW, an oxide of TiW, and oxide of ZrW, an oxide of NbW, an oxide of TaW, a nitride of Ti, a nitride of Zr, a nitride of Nb, a nitride of Mo, a nitride of Ta, a nitride of W, a nitride of CrTi, a nitride of CrZr, a nitride of CrNb, a nitride of CrMo, a nitride of CrTa, a nitride of CrW, a nitride of TiW, and oxide of ZrW, a nitride of NbW, and a nitride of TaW.

5. The component of claim 1, wherein the carbon overcoat has a thickness in a range from about 10 to 50 Å.

6. The component of claim 1, wherein the another sealing layer comprises a material selected from the group consisting of a refractory metal, a refractory metal-containing alloy, an oxide of a refractory metal, an oxide of a refractory metal-containing alloy, a nitride of a refractory metal, a nitride of a refractory metal-containing alloy, and combinations thereof.

7. A method for preventing corrosion of a magnetic layer due to contact start-stop of a recording medium, comprising exposing the magnetic layer to a refractory metal or a refractory metal-containing alloy, depositing a sealing layer comprising a second sealing layer directly on a first sealing layer and comprising the refractory metal or the refractory metal-containing alloy on the magnetic layer, and depositing a carbon overcoat on the second sealing layer, wherein the sealing layer prevents corrosion of the magnetic layer due to contact start-stop of the recording medium.

8. The method of claim 7, wherein the carbon overcoat is of a thickness in a range from about 10 to 50 Å.

9. The method of claim 7, wherein the refractory metal containing sealing layer has a thickness of less than 10 Å.

10. A method of manufacturing a component of a recording medium comprising depositing a first sealing layer on a magnetic layer, depositing a second sealing layer directly on the first sealing layer, and depositing a carbon overcoat on the second sealing layer, wherein the first sealing layer and the second sealing layer comprise a refractory metal or a refractory metal-containing alloy, wherein the first sealing layer has a thickness of less than 10 Å.

11. The method of claim 10, wherein the second sealing layer comprises a refractory metal or a refractory metal-containing alloy.

12. The method of claim 11, wherein the first sealing layer and/or the second sealing layer further comprise oxygen and/or nitrogen.

13. The method of claim 10, wherein the carbon overcoat has a thickness in a range from about 10 to 50 Å.

14. The method of claim 10, wherein the carbon overcoat is deposited by a technique selected from the group consisting of plasma enhanced chemical vapor deposition, ion beam deposition and filtered cathodic arc deposition.

15. A component of a recording medium, comprising a first sealing layer on a magnetic layer, a second sealing layer directly on the first sealing layer and a carbon overcoat on the second sealing layer, wherein the first sealing layer and the second layer comprise a refractory metal or a refractory metal-containing alloy.

* * * * *